United States Patent [19]

Lexell

[11] Patent Number: 5,316,464
[45] Date of Patent: May 31, 1994

[54] COMPACT DISC LABELING SYSTEM

[76] Inventor: Jason R. Lexell, 133 Ashdown Rd., Ballston Lake, N.Y. 12019

[21] Appl. No.: 991,577

[22] Filed: Dec. 16, 1992

[51] Int. Cl.$^5$ .............................................. B28B 3/00
[52] U.S. Cl. ...................................... 425/318; 156/64; 156/359; 156/378; 264/25; 425/385; 425/810
[58] Field of Search ............... 156/350, 359, 367, 378, 156/379, 64; 425/174.4, 174.4 E, 810, 385, 318; 264/22, 25, 106, 107, 293

[56] References Cited

U.S. PATENT DOCUMENTS

| | | |
|---|---|---|
| 1,301,721 | 4/1919 | McElroy et al. . |
| 1,345,115 | 6/1920 | Aylsworth et al. . |
| 1,433,389 | 10/1922 | Lewis ...................... 425/318 |
| 1,625,466 | 4/1927 | Hamnett . |
| 1,710,340 | 4/1929 | Bresson et al. . |
| 2,541,214 | 2/1951 | Davis ...................... 425/318 |
| 3,494,816 | 2/1970 | Fener ...................... 156/359 |
| 3,552,711 | 1/1971 | DeLaney et al. . |
| 3,822,164 | 7/1974 | Guido et al. ............. 156/359 |
| 3,918,875 | 11/1975 | Phillipson et al. . |
| 4,064,674 | 12/1977 | Palmer ..................... 425/810 |
| 4,127,377 | 11/1978 | Schlau et al. . |
| 4,313,718 | 2/1982 | Llabres et al. ............ 425/810 |
| 4,435,343 | 3/1984 | Ando et al. ............... 425/810 |
| 4,482,511 | 11/1984 | Komatsubara ............. 425/810 |
| 4,522,659 | 6/1985 | Prusak ..................... 425/810 |
| 4,723,903 | 2/1988 | Okazaki et al. ........... 425/810 |
| 4,767,486 | 8/1988 | Nakajima et al. ......... 425/810 |
| 5,078,947 | 1/1992 | Nishizawa et al. . |
| 5,087,184 | 2/1992 | Watanabe et al. ......... 425/810 |
| 5,112,205 | 5/1992 | Watanabe et al. ......... 425/174.4 |

FOREIGN PATENT DOCUMENTS

| | | | |
|---|---|---|---|
| 164896 | 1/1934 | Fed. Rep. of Germany | 425/318 |
| 2021998 | 11/1971 | Fed. Rep. of Germany | 425/318 |
| 961989 | 9/1982 | U.S.S.R. | 156/359 |

Primary Examiner—David A. Simmons
Assistant Examiner—William J. Matney, Jr.
Attorney, Agent, or Firm—Schmeiser, Morelle & Watts

[57] ABSTRACT

A compact disc labeling system for permanently imprinting a personalized label into the inner plastic ring of a compact disc. The invention includes a base member for receiving and securing a compact disc thereto, an interchangeable impact plate with outwardly protruding characters thereon corresponding to the personalized label and a handle member for compressing the impact plate against the inner plastic ring of a compact disc which has been secured to the base member. A thermostatically controlled heating system may be utilized to heat the interchangeable impact plate, thereby facilitating the penetration of the outwardly protruding characters into the inner plastic ring of the compact disc.

16 Claims, 3 Drawing Sheets

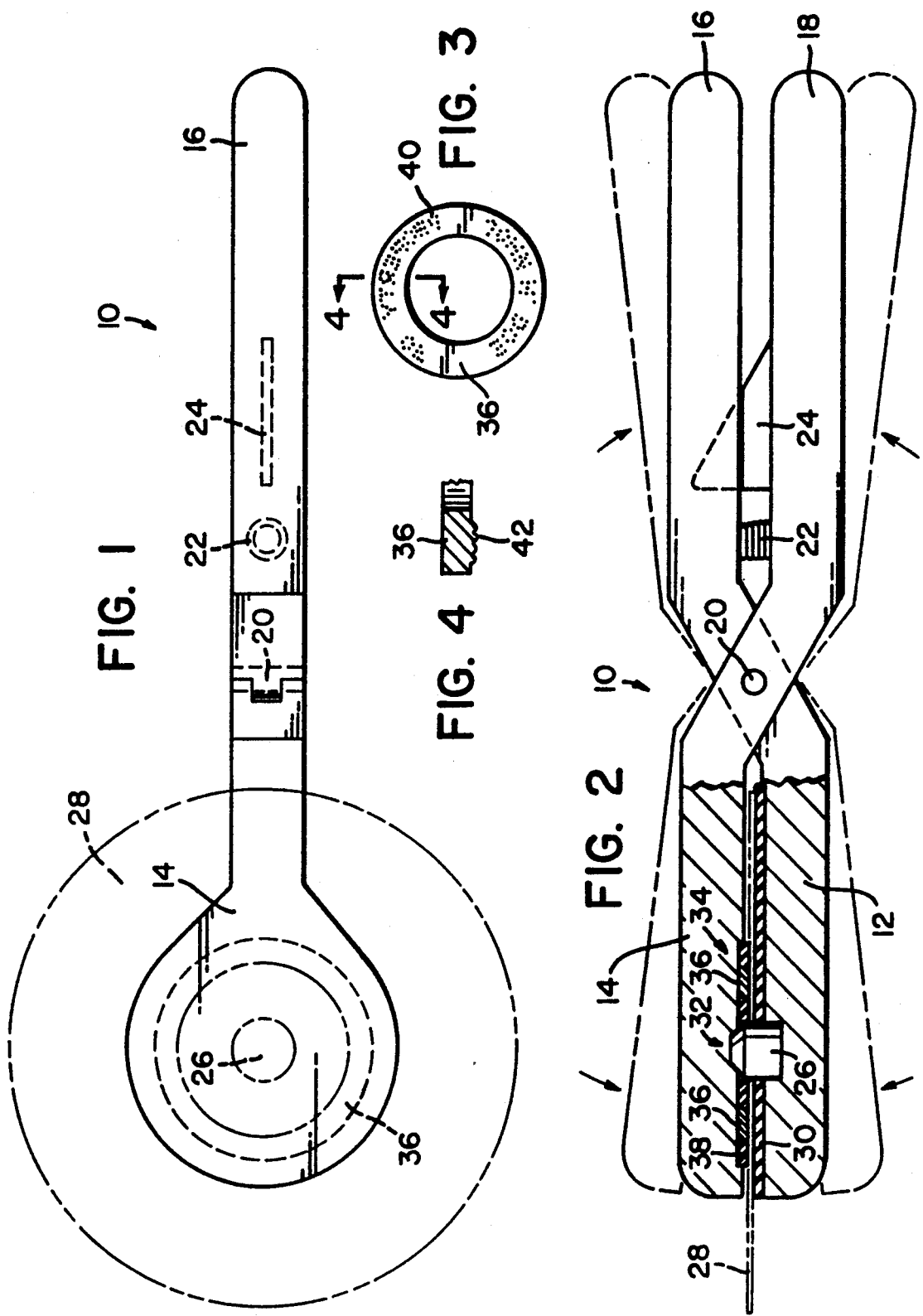

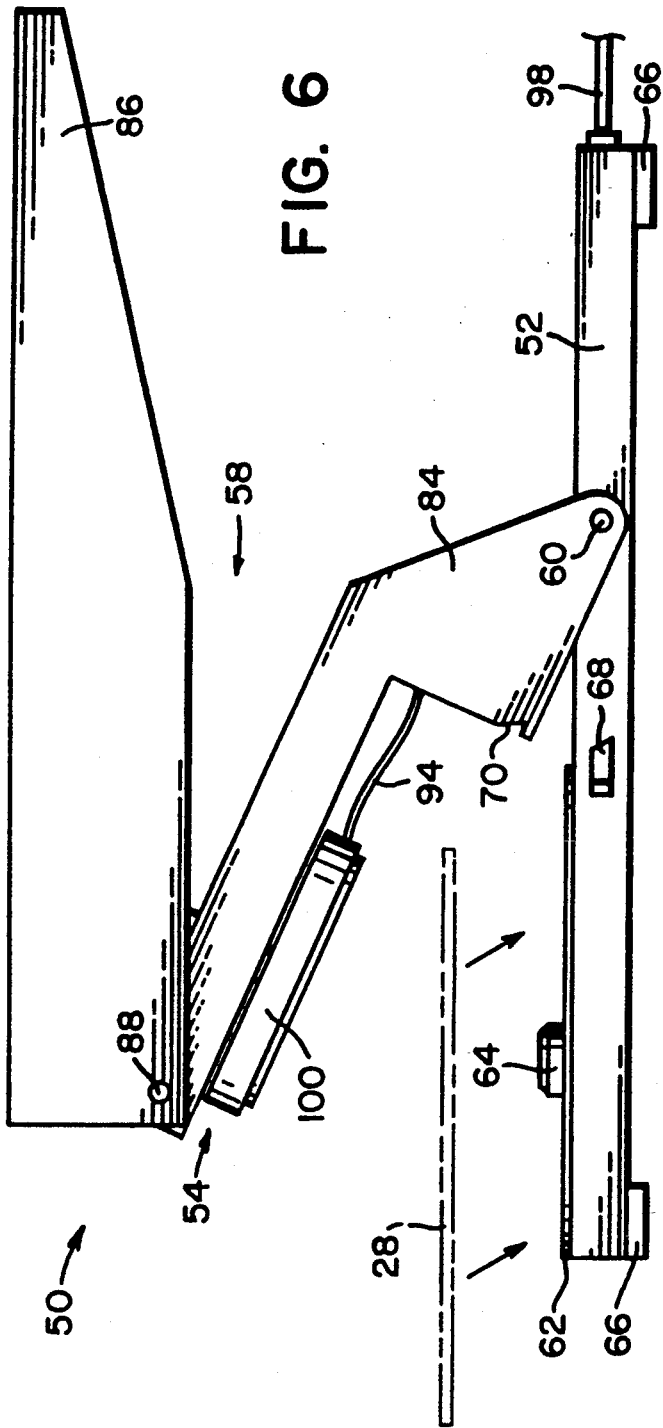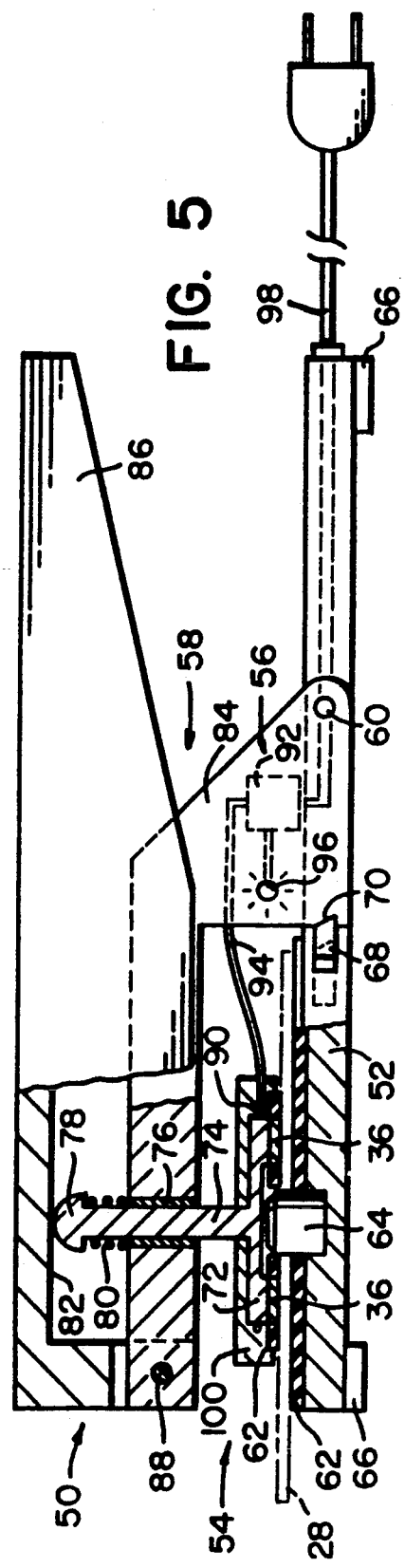

COMPACT DISC LABELING SYSTEM

FIELD OF THE INVENTION

The present invention relates to a labeling system and, more particularly, to a tool for permanently imprinting a personalized label into the inner plastic ring of a compact disc. The invention includes a base member for receiving and securing a compact disc thereto, an interchangeable impact plate with outwardly protruding characters thereon corresponding to the personalized label and a handle member for compressing the impact plate against the inner plastic ring of a compact disc which has been secured to the base member, thereby permanently imprinting the label into the compact disc. The labeling system may include a thermostatically controlled system for heating the interchangeable impact plate, thereby facilitating the penetration of the outwardly protruding characters into the inner plastic ring of the compact disc.

BACKGROUND OF THE INVENTION

Audio recordings have evolved from the primitive analog wax recordings of the early twentieth century to the sophisticated digital recordings provided by digital audiotape (DAT) and compact discs. Shortly after the end of World War II, manufacturers introduced long playing vinyl phonograph records that were designed to revolve at either 33⅓ or 45 revolutions per minute. Just as they made collections of the previously standard 78-rpm records substantially obsolete, compact discs in turn replaced long playing vinyl records in popularity in the late 1980's and early 1990's.

The compact disc offers many advantages over the heretofore standard long playing vinyl phonograph record. Most importantly, unlike records, the compact disc provides a pure, unadulterated and highly accurate digital reproduction of an audio recording. In addition to the improved sound quality, compact discs provide a greater dynamic range, offer a longer playing time, provide an increased immunity to distortion generated by dust and/or minor scratches and are not damaged during playback within a compact disc player.

A compact disc, which is approximately four and one half inches in diameter, generally includes a first data bearing side formed by covering a digitally encoded plastic baseplate with an optically reflective layer of aluminum and a protective layer of plastic, and a second informational side covered with indicia corresponding to the contents of the compact disc, the musical artist, the recording company and/or other associated information. Although compact discs are highly desirable in view of the abovedescribed audiophilic advantages, they suffer from several disadvantages due to their construction and small size. For example, the size of a compact disc allows it to be easily stolen because it is small enough to be hidden in a pocket, purse, container, book or other appropriate hiding place. In addition, the specific construction of a compact disc does not facilitate the personal labeling thereof and, consequently, compact discs that have been misplaced, borrowed with or without permission or stolen are commonly never returned. Unfortunately, unless a compact disc has been properly labeled, it is oftentimes impossible to positively identify the compact disc in order to facilitate its return to the original owner.

Compact discs are commonly labeled by applying an adhesive identification label over a portion of the informational side thereof. Although the application of an adhesive label may at first appear to solve the above-described problems and increase the probability of the return of a stolen, borrowed or misplaced compact disc, the label suffers from many disadvantages. First, the adhesive label commonly covers a portion of the indicia on the informational side of the compact disc, potentially concealing important information such as track descriptions, instruction or the like. Second, the adhesive labels may be easily removed, covered with an additional label containing identifying information corresponding to a "new" owner, or marked over. Finally, paper and adhesive residue from the adhesive label may damage the internal components of a compact disc player.

SUMMARY OF THE INVENTION

In order to avoid the disadvantages of the prior art, the present invention provides a tool for permanently imprinting a personalized label into the inner plastic ring of a compact disc.

In a first embodiment of the invention, the compact disc labeling tool includes first and second movable jaw elements and first and second handle members pivotally secured to one another for controlling the relative displacement of the first and second jaw elements, respectively, wherein the first moveable jaw element is formed unitarily with the first handle member and the second moveable jaw element is formed unitarily with the second handle member. In operation, the inwardly facing surfaces of the first and second jaw elements are adapted to be displaced toward each other and clamped together in response to the inwardly directed manually actuated compression of the first and second handle members. Preferably, the first and second jaw elements are substantially circular in configuration and have a diameter larger than the diameter of the inner plastic ring of a typical compact disc. The movable jaw elements and the handle members may be formed out of metal, plastic or any other suitable material.

The first jaw element includes an outwardly protruding mounting post on the inwardly facing surface thereof which is adapted to be inserted into the centrally located hole of a compact disc, thereby securing the compact disc to the first jaw element. Generally, the compact disc is positioned on the mounting post with the data bearing side facing downward, although the compact disc may be positioned on the mounting post with the informational side facing downward. To prevent the compact disc from being scratched or otherwise damaged during the placement and/or removal thereof from the mounting post on the first movable jaw element and during the operation of the compact disc labeling tool, the inwardly facing surface of the first movable jaw element and the top section of the mounting post may be covered with a protective layer of foam, rubber, plastic or other suitable material.

The inwardly facing surface of the second movable jaw element includes a first recessed area, positioned opposite the mounting post on the first jaw element, for receiving the mounting post therein during the operation of the compact disc labeling tool, and a second, concentric recess for removably receiving and securing an interchangeable annular impact plate having outwardly protruding characters thereon. The second recess may also include a protective layer of material, positioned adjacent the inner and/or outer perimeters of the annular impact plate, which preferably extends outward slightly farther than the outwardly protruding characters on the impact plate, thereby protecting the surface of the compact disc during the placement and/or removal thereof from the mounting post on the first movable jaw element. During the operation of the compact disc labeling tool, the protective material within the second recess is adapted to be compressed, thereby allowing the outwardly protruding characters on the impact plate to come into contact with the inner plastic ring of the compact disc.

The annular impact plate, which may be formed out of metal, plastic or any other suitable material, includes two substantially planar faces, at least one of which includes at least one outwardly protruding character thereon corresponding to a personalized label. Each of the outwardly protruding characters may be formed out of a plurality of discrete acicular metallic elements or as a single continuous metallic character. Preferably, the characters are formed integrally with the impact plate and are arranged circumferentially therearound. Alternatively, each of the characters may be individually secured to the impact plate, thereby facilitating the modification of the personalized label which is to be imprinted into the inner ring of a compact disc. The annular impact disc is adapted to be removably secured within the second recess in the inwardly facing surface of the second movable jaw element by any appropriate technique. For example, the impact plate may include fastening hardware which is adapted to be inserted into small apertures within the second recess.

In operation, a user of the first embodiment of the compact disc labeling system fastens an impact plate to the inwardly facing surface of the second movable jaw element, wherein the impact plate includes a plurality of outwardly protruding characters corresponding to a personalized label such as "PROPERTY OF JOHN H. DOE" thereon. After the desired impact plate has been properly secured, the user then positions a compact disc between the first and second movable jaw elements and inserts the outwardly protruding mounting post on the inwardly facing surface of the first jaw element through the centrally located hole of the compact disc. In order to permanently imprint the personalized label into the compact disc, a user simply squeezes the first and second handle members, thereby clamping the first and second jaw elements against each other and forcing the outwardly protruding characters on the impact plate into the inner plastic ring of the compact disc.

A second embodiment of the invention includes a base member for mounting and removably securing a compact disc thereon, an inverted T-shaped metallic shaft element for receiving and removably securing the above-described annular impact plate, a handle mechanism, hingedly fastened to the base member, for displacing the inverted T-shaped shaft element and for clamping the impact plate against the plastic inner ring of the mounted compact disc, thereby imprinting the outwardly protruding characters corresponding to a personalized label therein, and an electric, thermostatically controlled heating unit for heating the impact plate, thereby facilitating the penetration of the outwardly protruding characters on the impact plate into the plastic inner ring of the compact disc. Alternatively, the heating unit may be omitted, wherein the outwardly protruding characters on the impact plate are adapted to be imprinted into the plastic inner ring of the compact disc in response to the handle mechanism actuated clamping of the impact plate against the compact disc.

The base member includes an outwardly protruding mounting post which is adapted to be inserted into the centrally located hole of a compact disc, hinging hardware for hingedly fastening the handle mechanism thereto, and detent hardware for releasably engaging and fixedly positioning a first section of the handle mechanism relative to the base member during the operation of the compact disc labeling tool. Again, to prevent the compact disc from being scratched or otherwise damaged during the placement and/or removal thereof from the mounting post on the base member and during the operation of the compact disc labeling tool, the inwardly facing surface of the base member and the top section of the mounting post may be covered with a protective layer of foam, rubber, plastic or other suitable material. In addition, the base member may include a plurality of feet composed of rubber, plastic or the like on the bottom thereof to prevent the compact disc labeling tool from sliding on a table, desk or other operational surface, during the clamping of the impact plate against the compact disc.

The inverted T-shaped shaft element includes a substantially horizontally oriented bottom section for removably securing the annular impact plate thereon and a shaft extending vertically therefrom which is adapted to be slidably displaced within an aperture in the handle mechanism. Preferably, the upper end of the shaft includes a head, having a diameter larger than the diameter of the shaft, for retaining the inverted T-shaped shaft element within the aperture in the handle mechanism. In addition, a biasing spring, for controlling the relative distance between the bottom section of the inverted T-shaped shaft element and the base member and for biasing the head of the shaft against an inside surface of the handle mechanism, may be positioned about the shaft immediately below the head thereof.

The inwardly facing surface of the bottom section of the inverted T-shaped shaft element may include a first recessed area, positioned opposite the mounting post on the base member, for receiving the mounting post therein during the operation of the compact disc labeling tool, and a second, concentric recess for removably receiving and securing an annular metallic impact plate having outwardly protruding characters corresponding to a personalized label thereon. To protect a compact disc prior to the actuation of the compact disc labeling tool, the second recess may include a protective layer of material, positioned adjacent the inner and/or outer perimeters of the annular impact plate, which preferably extends outward slightly farther than the outwardly protruding characters on the impact plate. During the operation of the compact disc labeling tool, the protective material within the second recess is adapted to be compressed, thereby allowing the outwardly protruding characters on the impact plate to come into contact with the inner plastic ring of the compact disc.

The handle mechanism includes a first section, hingedly fastened proximate a first end thereof to a middle portion of the base member, for slidably receiving the inverted T-shaped shaft element and for enclosing the thermostatically controlled heating unit, and a second section, pivotally fastened proximate a second, opposite end of the first section of the handle mechanism, for controlling the displacement of the inverted T-shaped shaft element and the clamping of the impact plate against the plastic inner ring of a mounted compact disc. The first section of the handle mechanism includes at least one notch adapted to be engaged by the base member detent hardware, and an aperture therethrough for slidably receiving the inverted T-shaped shaft element. To facilitate the displacement of the shaft element therein, the aperture may be lined with a material having a low coefficient of friction. An inside surface of the second section of the handle mechanism is adapted to engage the top of the head of the inverted T-shaped shaft element, wherein a pivotal displacement of the second section of the handle mechanism relative to the first section of the handle mechanism results in a vertical displacement of the inverted T-shaped shaft element within the above-describe aperture.

In operation, the first section of the handle mechanism may be pivoted away from the base member after the base member detent hardware has been disengaged from the notches on the first section, thereby facilitating the mounting of a compact disc on the outwardly protruding mounting post and allowing a user to easily secure an impact plate to the bottom of the inverted T-shaped shaft element. After the compact disc and the desired impact plate have been properly mounted and/or secured, the first section of the handle mechanism may be pivoted toward its operational position until the detent hardware reengages the notch on the first section. The outwardly protruding characters on an impact plate may then be permanently imprinted into the inner ring of the mounted compact disc by pivoting the second section of the handle mechanism in a downward direction. To remove the thus labeled compact disc from the outwardly protruding mounting post on the base member, a user simply disengages the base member detent hardware from the notch on the first section and pivots the first section away from the base member.

The thermostatically controlled heating unit for heating the impact plate includes at least one heating coil operatively connected to the inverted T-shaped shaft element, a thermostat, a temperature indicator light and an electrical cord adapted to be plugged into a standard household electrical outlet. In operation, the thermostatically controlled heating unit may be actuated by plugging the electrical cord directly into an electric outlet or in response to the manipulation of a switch thereafter. When the thermostat determines that the inverted T-shaped shaft element and the impact plate secured thereto have reached the proper operational temperature, the temperature indicator light is turned on. In response to the activation of the indicator light, a user presses down on the second section of the handle mechanism for a predetermined period of time, thereby permanently imprinting the outwardly protruding characters on an impact plate into the inner plastic ring of a mounted compact disc. To avoid damaging the compact disc, the thermostat is adapted to turn off the flow of electricity to the heating coils before the impact plate reaches a potentially damaging temperature. Alternatively, the thermostat may turn off the flow of electricity to the heating coils after a predetermined period of time.

Although the present invention has been described with respect to the labeling of compact discs containing digital data corresponding to music, computer related information (CD ROM) and/or photographic information (Photo CD), it may also be utilized to label other types of plastic discs such as laser discs or the like.

BRIEF DESCRIPTION OF THE DRAWINGS

FIG. 1 is a plan view of a compact disc labeling system according to a first embodiment of the present invention;

FIG. 2 is a side operational view of the compact disc labeling system illustrated in FIG. 1;

FIG. 3 is a bottom view of a removable impact plate including the phrase "PROPERTY OF JOHN H. DOE", each character of which is formed by a plurality of outwardly protruding acicular elements;

FIG. 4 is a cross-sectional view of the impact plate taken along line 4—4 of FIG. 3;

FIG. 5 is a cut-away view of a compact disc labeling system according to a second embodiment of the present invention;

FIG. 6 is a side elevational view of the compact disc labeling system illustrated in FIG. 5.

DETAILED DESCRIPTION OF THE INVENTION

Figure 7:
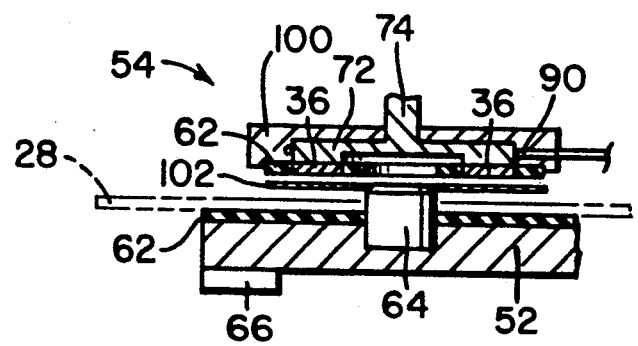
FIG. 7 is a partial view of the system of FIG. 5 with a color transfer member inserted between the impact plate and the compact disc.

Referring now to FIGS. 1 and 2, a first embodiment of a compact disc labeling system, generally designated as 10, for permanently imprinting a personalized label into the inner plastic ring of a compact disc, includes a first movable jaw element 12, a second opposing movable jaw element 14, a first handle member 16 and a second handle member 18 pivotally secured to the first handle member by a pivot 20. As illustrated in FIG. 2, the inwardly directed manual manipulation of the first and second handle members 16, 18, respectively, controls the inwardly directed displacement of the first and second movable jaw members 12, 14, respectively, thereby clamping inwardly facing surfaces of the jaw elements against each other. A spring 22, for outwardly biasing the first and second handle members, and a handle guide 24, for operationally aligning the first and second handle members, are provided to facilitate the operation of the compact disc labeling tool 10.

The first jaw element 12 includes an outwardly protruding mounting post 26 on the inwardly facing surface thereof which is adapted to be inserted into the centrally located hole of a compact disc 28. The inwardly facing surface of the first jaw element 12 may be covered with a protective layer of material 30 to prevent the exterior of the compact disc 28 from being damaged during the mounting and dismounting thereof and during the operation of the compact disc labeling tool 10.

The inwardly facing surface of the second jaw element 14 includes a first recess 32 for receiving the mounting post 26 when the first and second jaw elements are clamped together and a second recess 34 for receiving and removably securing an annular impact plate 36 therein. The second recess may also be covered with a layer of protective material 38, positioned adjacent the impact plate 36, to protect the exterior of the compact disc 28.

Referring now to FIGS. 3 and 4, the annular impact plate 36 includes at least one outwardly protruding character 40 thereon corresponding to a personalized label. As illustrated in FIG. 4, each of the outwardly protruding characters 40 may be formed out of a plurality of discrete acicular elements 42 which are adapted to penetrate the inner plastic ring of the compact disc 28.

As illustrated in FIGS. 5 and 6, a compact disc labeling tool according to a second embodiment of the invention, generally designated as 50, includes a base member 52 for mounting a compact disc 28 thereon, an inverted T-shaped shaft element 54 for removably securing an annular impact plate 36 thereto, a thermostatically controlled heating unit 56 for heating the impact plate 36, and a handle mechanism 58, hingedly secured to the base member 52 by a pivot 60, for displacing the inverted T-shaped shaft element 54 and for clamping the annular impact plate 36 against the plastic inner ring of a compact disc 28.

The base member 52 includes a protective layer of material 62 to prevent any operational damaging of the compact disc 28, an outwardly protruding mounting post 64 for securing the compact disc 28 thereon, a plurality of slide resistant feet 66, a pivot 60 for hingedly fastening the handle mechanism 58 thereto, and detent hardware 68 for releasably engaging a notch 70 on said handle mechanism.

The inverted T-shaped shaft element 54 includes a substantially horizontal bottom section 72 for removably securing the annular impact plate 36 thereto, a vertically oriented shaft 74, slidably received within a lined aperture 76 in the handle mechanism 58, and a head 78 for retaining the shaft element 54 from within the aperture 76. A biasing spring 80 is utilized to control the relative distance between the bottom section 72 of the inverted T-shaped shaft element and the base member 52, and to bias the head 78 of the shaft against an inside surface 82 of the handle mechanism 58. Also, the bottom section 72 may include first and second recesses for receiving the outwardly protruding mounting post 26 and the annular impact plate 36, respectively, and a layer of protective material 62 adjacent the inner and outer periphery of the impact plate.

The handle mechanism 58 includes a first section 84 which is hingedly secured proximate a first end thereof to the base member 52 by a pivot 60, and a second section 86, hingedly secured to a second end of the first handle section by a pivot 88. As illustrated in FIG. 5, the first section 84 of the handle mechanism includes the aperture 76 therethrough for slidably receiving the inverted T-shaped shaft element 74, and the notch 70 which is adapted to be releasably engaged by the base member detent hardware 68. In addition, the first section 84 of the handle member is designed to enclose the thermostatically controlled heating unit 56. Similarly, the second section 86 of the handle mechanism includes an inside surface 82 which operationally engages the head 78 of the vertically oriented shaft 74.

The thermostatically controlled heating unit 56 is utilized to heat the inverted T-shaped shaft element 54 and an impact plate 36 fastened thereto. When the outwardly protruding characters 40 on the heated impact plate are clamped against the inner plastic ring of a mounted compact disc 28, the plastic is softened, thereby facilitating the penetration of the characters into the plastic. In particular, the thermostatically controlled heating unit 56 includes at least one heating coil 90 which may be secured about the periphery of the bottom section 72 of the inverted T-shaped shaft element, a thermostat 92, operatively connected to the heating coils 90 by wiring 94, a temperature indicator light 96 and an electrical cord 98 adapted to be plugged into a standard household electrical outlet. To prevent the heated impact plate from injuring a user of the compact disc labeling system, it may be coated with a layer of insulating material 100. Referring now to FIG. 7, there is illustrated a system for imprinting a colored personalized label into the plastic inner ring of the compact disc 28. In particular, a color transfer member 102, of the type well known in the art, may be inserted between the annular impact plate 36 and the compact disc 28 prior to compression.

The foregoing description of the preferred embodiments of the invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims. For example, a colored personalized label may be imprinted into the plastic inner ring of a compact disc by inserting a color transfer material between the impact plate and the compact disc prior to compression.

I claim:

1. An apparatus for labeling a compact disc comprising:
   means for operatively mounting said compact disc, said compact disc having digital data encoded thereon and an inner ring including a centrally disposed aperture therethrough;
   an impact plate including at least one substantially outwardly protruding character thereon;
   impact plate securing means for removably receiving said impact plate; and
   means for controlling the relative displacement of said impact plate securing means and said compact disc mounting means and for compressing said impact plate against the inner ring of said compact disc, wherein said at least one outwardly protruding character on said impact plate is adapted to penetrate the inner ring of said compact disc, thereby imprinting a label corresponding to said at least one character therein.

2. The apparatus of claim 1 wherein each of said outwardly protruding characters on said impact plate is formed from at least one penetrating element.

3. The apparatus of claim 1 further including:
   means for heating said impact plate to an appropriate operating temperature, thereby facilitating the penetration of said at least one outwardly protruding character into said compact disc.

4. The apparatus of claim 3 further including:
   means for thermostatically controlling said heating means, thereby controlling the temperature of said impact plate.

5. The apparatus of claim 4 further including:
   means for indicating that said impact plate has been heated to said operating temperature by said heating means.

6. The apparatus of claim 5 wherein said indicating means includes means for providing a visual indication.

7. The apparatus of claim 3 further including:
   means for maintaining the operating temperature of said impact plate for a predetermined period of time.

8. The apparatus of claim 1 wherein said impact plate is annular in configuration and includes two opposing substantially planar faces.

9. The apparatus of claim 8 wherein at least one of said substantially planar faces of said annular impact plate includes said outwardly protruding characters thereon.

10. The apparatus of claim 1 wherein said mounting means includes means for protecting a first surface of said compact disc during the mounting of said compact disc thereon and during the operation of said labeling apparatus.

11. The apparatus of claim 10 wherein said means for removably securing said impact plate includes means for protecting a second surface of said compact disc, opposite said first surface, during the operation of said labeling apparatus.

12. The apparatus of claim 1 wherein said displacement controlling means includes first and second lever means pivotally secured to each other and operatively connected to said mounting means and said impact plate securing means, respectively, whereby the relative positioning of said first and second lever means controls the relative displacement of said mounting means and said impact plate securing means.

13. The apparatus of claim 1 wherein said impact plate securing means includes;
   a downwardly extending shaft element; and
   an impact plate securing element operatively connected to a lower portion of said shaft element.

14. The apparatus of claim 13 wherein said displacement controlling means includes;
   means for slidably receiving said downwardly extending shaft element; and
   lever means for controlling the displacement of said shaft element within said means for slidably receiving;
   wherein said downwardly extending shaft element is adapted to slide within said receiving means in response to the operation of said lever means, thereby compressing the impact plate secured to said impact plate securing element against said portion of said compact disc.

15. The apparatus according to claim 1 further including:
   means for coloring said label, said coloring means including a color transfer member adapted to be inserted between said impact plate and said compact disc prior to the compression of said impact plate against the inner ring of said compact disc.

16. An apparatus for labeling a compact disc which has been encoded with digital data and which includes an inner ring having a centrally disposed aperture therethrough, comprising:
   an impact plate including at least one substantially outwardly protruding character thereon;
   impact plate securing means for removably receiving said impact plate;
   mounting means for securing said compact disc to said labeling appartus, said mounting means including means for positioning the inner ring of said compact disc to receive said impact plate;
   means for controlling the relative displacement of said impact plate securing means and said compact disc mounting means and for compressing said impact plate against the inner ring of said compact disc, wherein said at least one outwardly protruding character on said impact plate is adapted to penetrate the inner ring of said compact disk, thereby imprinting a label corresponding to said at least one character therein; and
   means for coloring said label, said coloring means including a color transfer member adapted to be inserted between said impact plate and said compact disc prior to the compression of said impact plate against the inner ring of said compact disc.

* * * * *